United States Patent
Andrea et al.

(10) Patent No.: US 6,901,805 B2
(45) Date of Patent: Jun. 7, 2005

(54) DEVICE FOR MEASURING THE PRESSURE OF A FLUID

(75) Inventors: Moroni Andrea, Gorla Minore (IT); Volonterio Eugenio, Appiano Gentile (IT)

(73) Assignee: ABB Service S.r.l., Milan (IT)

( * ) Notice: Subject to any disclaimer, the term of this patent is extended or adjusted under 35 U.S.C. 154(b) by 224 days.

(21) Appl. No.: 10/343,511

(22) PCT Filed: Jul. 23, 2001

(86) PCT No.: PCT/EP01/08507

§ 371 (c)(1),
(2), (4) Date: Jan. 31, 2003

(87) PCT Pub. No.: WO02/10701

PCT Pub. Date: Feb. 7, 2002

(65) Prior Publication Data

US 2004/0045360 A1 Mar. 11, 2004

(30) Foreign Application Priority Data

Jul. 31, 2000 (IT) .................................... MI2000A1775

(51) Int. Cl.$^7$ ................................................ G01L 9/00
(52) U.S. Cl. ............................. 73/716; 73/700; 73/736
(58) Field of Search .......................... 73/700, 715, 716, 73/736, 754

(56) References Cited

U.S. PATENT DOCUMENTS

| 5,275,055 | A | | 1/1994 | Zook et al. |
|---|---|---|---|---|
| 5,417,115 | A | | 5/1995 | Burns |
| 5,550,516 | A | | 8/1996 | Burns et al. |
| 5,798,851 | A | * | 8/1998 | Tachihara et al. .............. 359/18 |
| 5,869,761 | A | * | 2/1999 | Nakamura ................ 73/514.34 |
| 6,053,045 | A | * | 4/2000 | Nakamura ................ 73/514.34 |
| 6,706,836 | B1 | * | 3/2004 | Holguin et al. .............. 526/320 |

* cited by examiner

*Primary Examiner*—Edward Lefkowitz
*Assistant Examiner*—Andre Alen
(74) *Attorney, Agent, or Firm*—Connolly Bove Lodge & Hutz LLP

(57) ABSTRACT

A pressure sensing device for measuring the pressure of a fluid, comprising: a measurement diaphragm which is at least partially made of semiconductor material, is provided with a first surface and a second surface which are exposed respectively to a first pressure and to a second pressure, and undergoes a deformation following the application of the first pressure and of the second pressure; and a resonant element made of semiconductor material which is provided with a first end portion and with a second end portion for mechanically coupling the resonant element to the measurement diaphragm, the oscillation frequency of the resonant element varying according to the deformation to which the measurement diaphragm is subjected; and first circuit means for generating a sensing signal which is indicative of the oscillation frequency of the resonant element. Its particularity consisting of the fact that the resonant element comprises second circuit means for increasing the intensity of the sensing signal which is indicative of the oscillation frequency of the resonant element, the second circuit means being integrated with the structure of the resonant element.

20 Claims, 5 Drawing Sheets

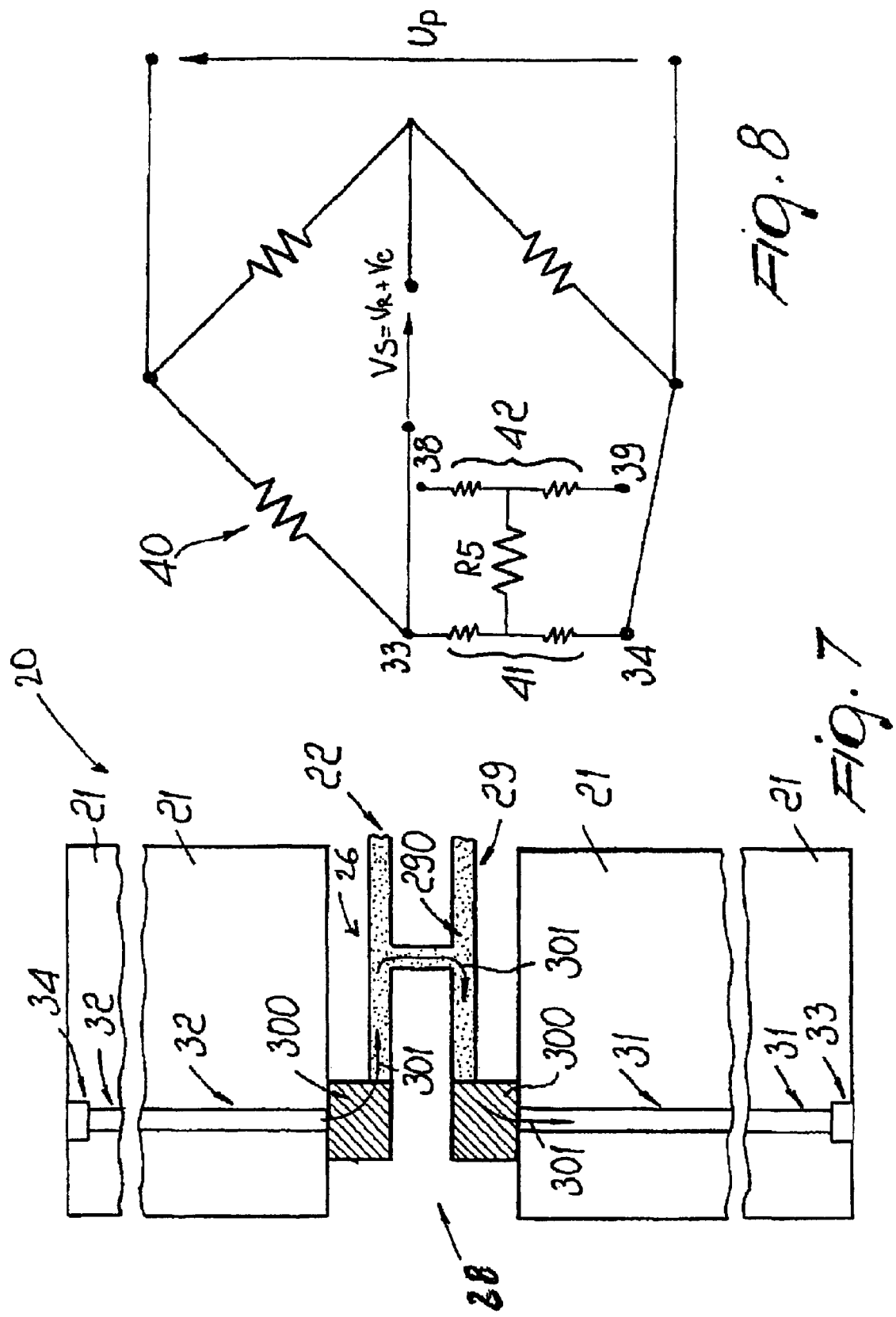

DEVICE FOR MEASURING THE PRESSURE OF A FLUID

DESCRIPTION

The present invention relates to a pressure sensing device for measuring the pressure of a fluid. More particularly, the present invention relates to a pressure sensing device, which is particularly suitable for the use in industrial-type (absolute, differential or gauge) pressure measuring apparatuses, such as, for example, pressure transmitters and the like.

It is known that various kinds of devices for sensing the pressure of a fluid have been developed in the state of the art. These devices are based on different pressure transduction principles. For example, pressure sensing devices that are of the capacitive type, piezoresistive type, optical type, and the like are widely known.

Also, it is known that, recently, pressure sensing devices made of semiconductor material, for example silicon, have been developed. In general, pressure sensing devices of this type are realized adopting so-called "silicon micromachining" technologies, which allow to obtain two-dimensional or three-dimensional semiconductor structures with mechanical properties that can be well defined during design, despite their extremely small size (down to a few tens of microns). Accordingly, these structures are capable of measuring/transducing a mechanical quantity (for example the pressure of a fluid) with high accuracy, while maintaining the advantages, in terms of repeatability and reliability, that are typical of integrated circuits. In the field pressure sensing devices, made of semiconductor materials, the so-called "resonant-type" pressure sensing devices have become widespread in the industrial field. These devices have considerable advantages, such as, for example, high accuracy and stability of measurement even for very wide measurement ranges (up to several hundred bars).

Figure 1:
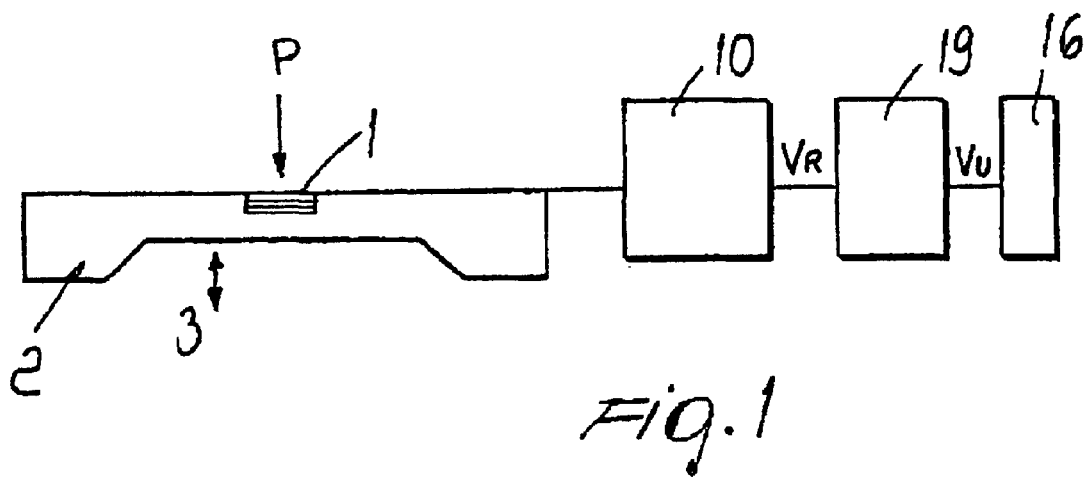

A known resonant-type pressure sensing device, made of semiconductor material, is shown schematically in FIG. 1.

A structural element 1, made of semiconductor material, is free to oscillate in a state of mechanical resonance. The resonant element 1 is generally connected mechanically to another semiconductor structure 2 (for example a diaphragm), which is capable of undergoing a deformation (indicated by the arrow 3), following the application of a pressure P to be measured. The deformation 3 of the diaphragm 2 entails the application of mechanical stresses to the resonant element 1, which accordingly varies its own mechanical resonance frequency. Detecting, by means of an electronic circuit 10, the mechanical resonance frequency of the resonant element 1 allows obtaining a frequency-variable signal, which is indicative of the value of the pressure of the fluid. In the common practice, an electronic circuit of the so-called "bridge type", such as the one shown in FIG. 2 (reference $10a$), is used to detect the resonance frequency of the resonant element 1.

The bridge circuit $10_a$ comprises three balanced resistive elements (R1, R2 and R3) and the resonant element 1, which has, in static conditions, an equivalent resistance R4, whose value basically depends on the semiconductor material and the structure of the resonant element 1. The bridge circuit $10_a$ is biased, at the terminals 11 and 12, with a bias voltage $V_P$ whose value can also reach values of several tens of volts, according to the needs. The oscillating state of the resonant element 1 entails a periodic variation of its own equivalent resistance R4. This is due to the fact that the semiconductor resonant element 1 behaves as a piezoresistive element. Thus, it varies its own resistivity, if subjected to the reversible mechanical flexural/compression stresses that are typical of the state of mechanical resonance.

The periodic variation of the resistance R4 provokes, owing to the balancing of the bridge circuit $10_a$, the generation of a voltage imbalance signal $V_S$ at the terminals 13 and 14 of the bridge circuit $10_a$. The imbalance signal $V_S$ comprises the overlap of a continuous voltage signal $V_C$, proportional to the bias voltage $V_P$, and an alternating voltage signal $V_R$, whose frequency is equal to the resonance frequency of the resonant element 1. The signal $V_R$ represents a sensing signal, which is indicative of the resonance frequency of the resonant element 1. Each variation of the resonance frequency of the resonant element 1, caused by the application of a pressure P to the diaphragm 2, leads to a variation in the frequency of the signal $V_R$. Thus, the signal $V_R$ is also indicative of the pressure P, applied to the diaphragm 2.

Figure 3:
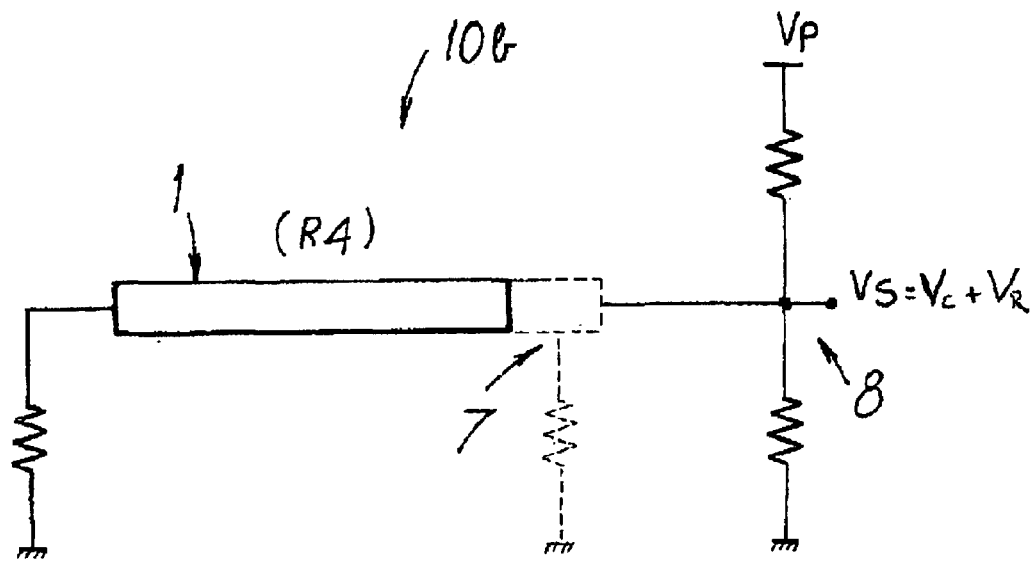

In order to detect the resonance frequency of the resonant element 1, other sensing circuits are known. One of these is described in U.S. patent application No. 5,275,055 and is schematically represented in FIG. 3 (reference $10_b$). A voltage divider 8 is coupled to the resonant element 1, by means of a direct electrical connection or a piezoresistive element 7 (dashed line of FIG. 3). Also in this case, the signal $V_S$, in output from the sensing circuit $10_b$, comprises a continuous signal $V_C$, proportional to the bias voltage $V_P$, and an alternating sensing signal $V_R$. The alternating signal $V_R$ is due to the variation in equivalent resistance of the resonant element 1, in a state of mechanical oscillation, or due to the variation in equivalent resistance of the piezoresistive element 7, associated with the resonant element 1.

Known resonant-type pressure sensing devices, despite of some undisputed advantages in terms of accuracy and stability, have drawbacks.

Practice has shown that the sensing signal $V_R$ has often a very low intensity. In fact, often, the signal $V_R$ can have a peak-to-peak amplitude of a few tens of microvolts, even for a bias voltage $V_P$ of several tens of volts.

This is due to the fact that the resonant element 1 has, inherently, a very high equivalent resistance. In fact, the mechanical structure of the resonant element 1 can be relatively complicated, since it is essentially aimed at enhancing as much as possible, for an equal variation in the applied pressure P, the corresponding variation in the resonance frequency. For example, one structure, which is typically used in the state of the art, is the so-called DETF (Double Ended Tuning Fork) structure, shown schematically in FIG. 4. According to this structure, the resonant element 1 comprises two oscillating arms 17 and 18. In order to optimize mechanical performance, the arms 17 and 18 may have a very small thickness S and width L (a few microns) and a relatively significant length 1 (hundreds of microns). This means that the equivalent resistance for this type of resonant element made of silicon can easily reach relatively high values (tens of MOhms). This it often happens that the percentage variation of the equivalent resistance (R4) of the resonant element 1, in a state of mechanical resonance, is relatively low. Therefore, also the signal $V_R$ has necessarily a relatively low intensity, since the voltage $V_P$ generally does not assume excessively high values, in order to avoid an excessive power dissipation.

On the other hand, also the use of a piezoresistive element, associated with the resonant element 1, has not proven to be a satisfactory solution to this problem. The practice has shown that it can be difficult to mechanically couple the piezoresistive element to the structure of the resonant element. In fact, this mechanical coupling often entails damping phenomena. This means that the flexural/compression stresses, to which the structure of the resonant element is subjected, are not optimally transmitted to the resonant element. This entails a reduced intensity for the sensing signal $V_R$. The reduced intensity of the signal $V_R$ makes necessary the use of relatively complicated auxiliary electronics (reference numeral 19 in FIG. 1), in order to obtain a useful sensing signal $V_U$ to send in input to the electronics 16 of the pressure transmitter.

Furthermore, due to its low intensity, the sensing signal $V_R$ can be greatly affected by external electromagnetic noise, which can have an amplitude comparable to that one of the signal $V_R$. This can compromise the accuracy of the measurement. Therefore, it is often necessary to provide an appropriate shielding in order to avoid electromagnetic interference. Clearly, all these drawbacks lead to an increase in the manufacturing and operating costs of the entire pressure transmitter.

Therefore, the aim of the present invention is to provide a resonant-type pressure sensing device, for measuring the pressure of a fluid, which allows obtaining a sensing signal (such as the mentioned electrical signal $V_R$), indicative of the oscillation frequency of the resonant element, which is provided with a relatively high intensity.

Within the scope of this aim, an object of the present invention is to provide a resonant-type pressure sensing device, which allows avoiding the use of auxiliary electronics for the preliminary processing of the sensing signal.

Another object of the present invention is to provide a resonant-type pressure sensing device, which can be easily produced by means of so-called "silicon micromachining" technologies and at relatively low cost.

Thus, the present invention provides a pressure sensing device for measuring the pressure of a fluid, which comprises:

a measurement diaphragm, which is at least partially made of semiconductor material; the measurement diaphragm is provided with a first surface and a second surface that are exposed respectively to a first pressure and to a second pressure; the measurement diaphragm is subjected to a deformation, following the application of said first pressure and of said second pressure; and a resonant element, at least partially made of semiconductor material; the resonant element is provided with a first end portion and with a second end portion for mechanically coupling the resonant element to the measurement diaphragm, the oscillation frequency of the resonant element varying according to the deformation to which, the measurement diaphragm is subjected; and first circuit means for generating a sensing signal, which is indicative of the oscillation frequency of the resonant element.

The pressure sensing device, according to the present invention, is characterized in that the resonant element comprises second circuit means for increasing the intensity of the sensing signal, indicative of the oscillation frequency of the resonant element. The second circuit means are at least partially integrated with the structure of said resonant element.

The pressure sensing device, according to the present invention, entails considerable advantages. In particular, the second circuit means allow obtaining a sensing signal, of relatively high intensity. As explained in details hereinafter, the second circuit means, despite of being, at least partially, integrated in the physical structure of the resonant element, inherently act as a stage for the amplification of the sensing signal generated by the first circuit means. In this manner it is possible to avoid the use of auxiliary electronics for the preliminary processing of the sensing signal.

Figure 2:
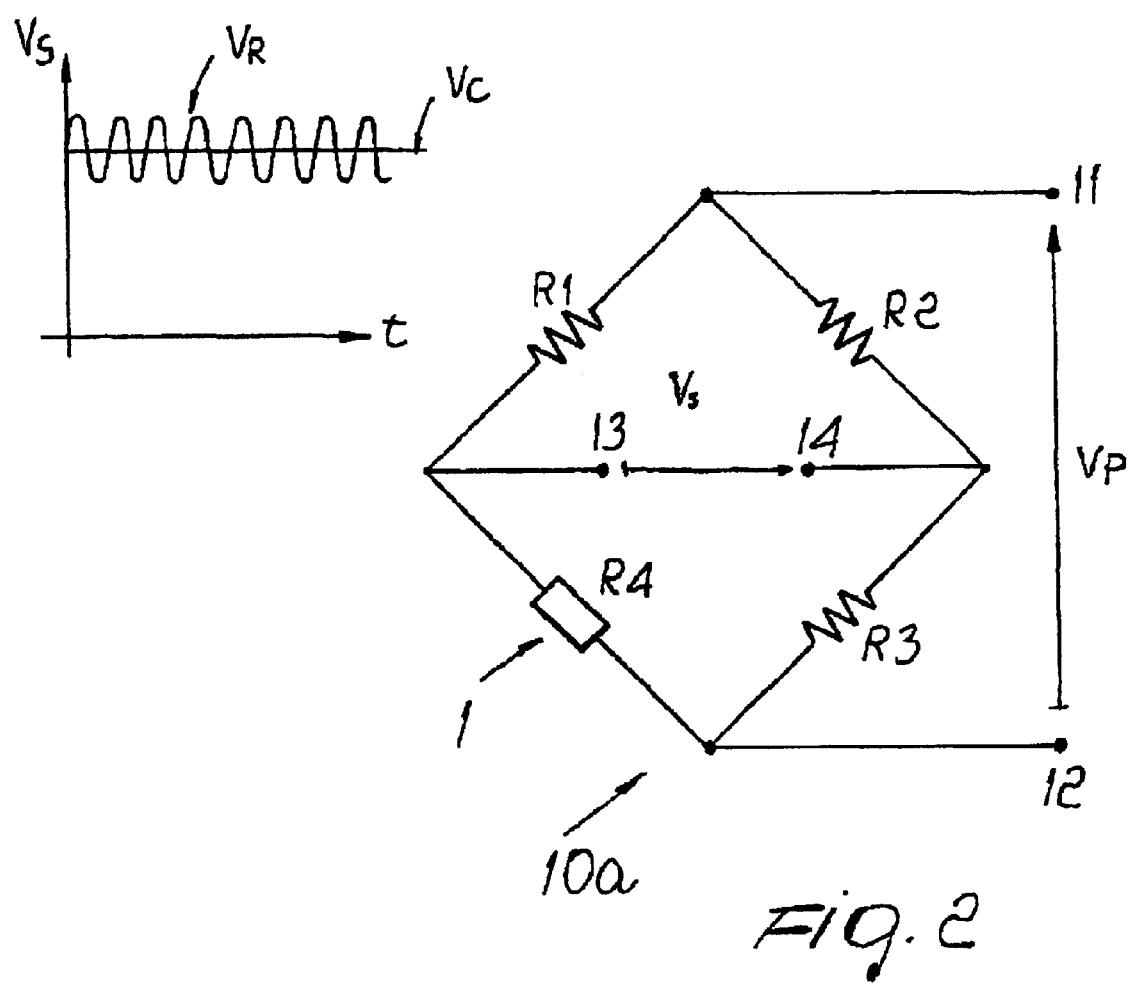
Figure 4:
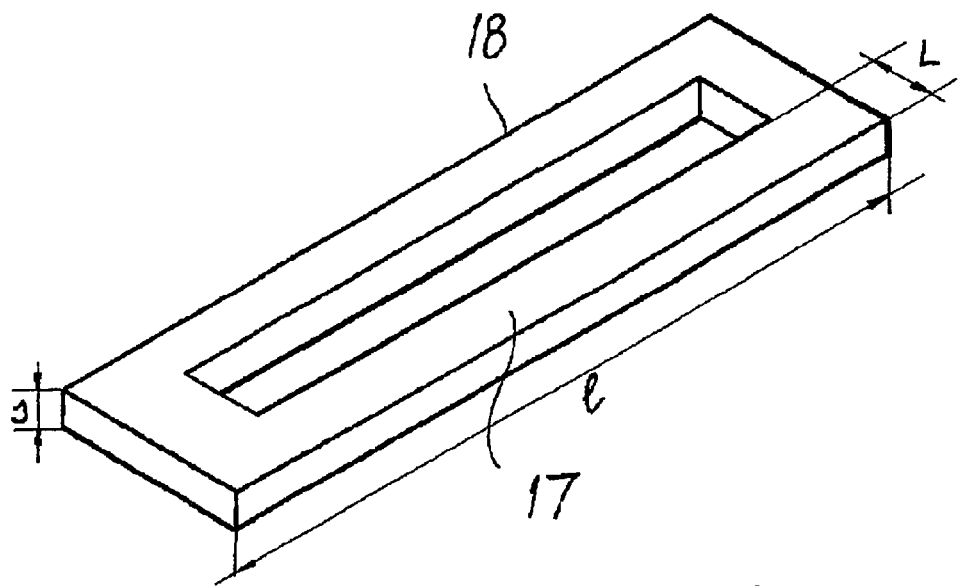
Figure 5:
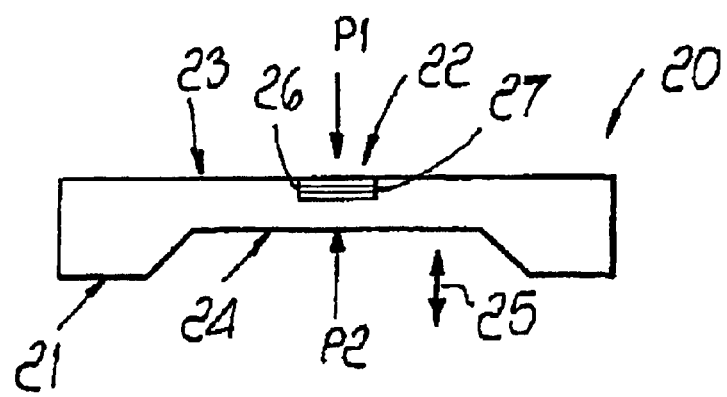
Figure 6:
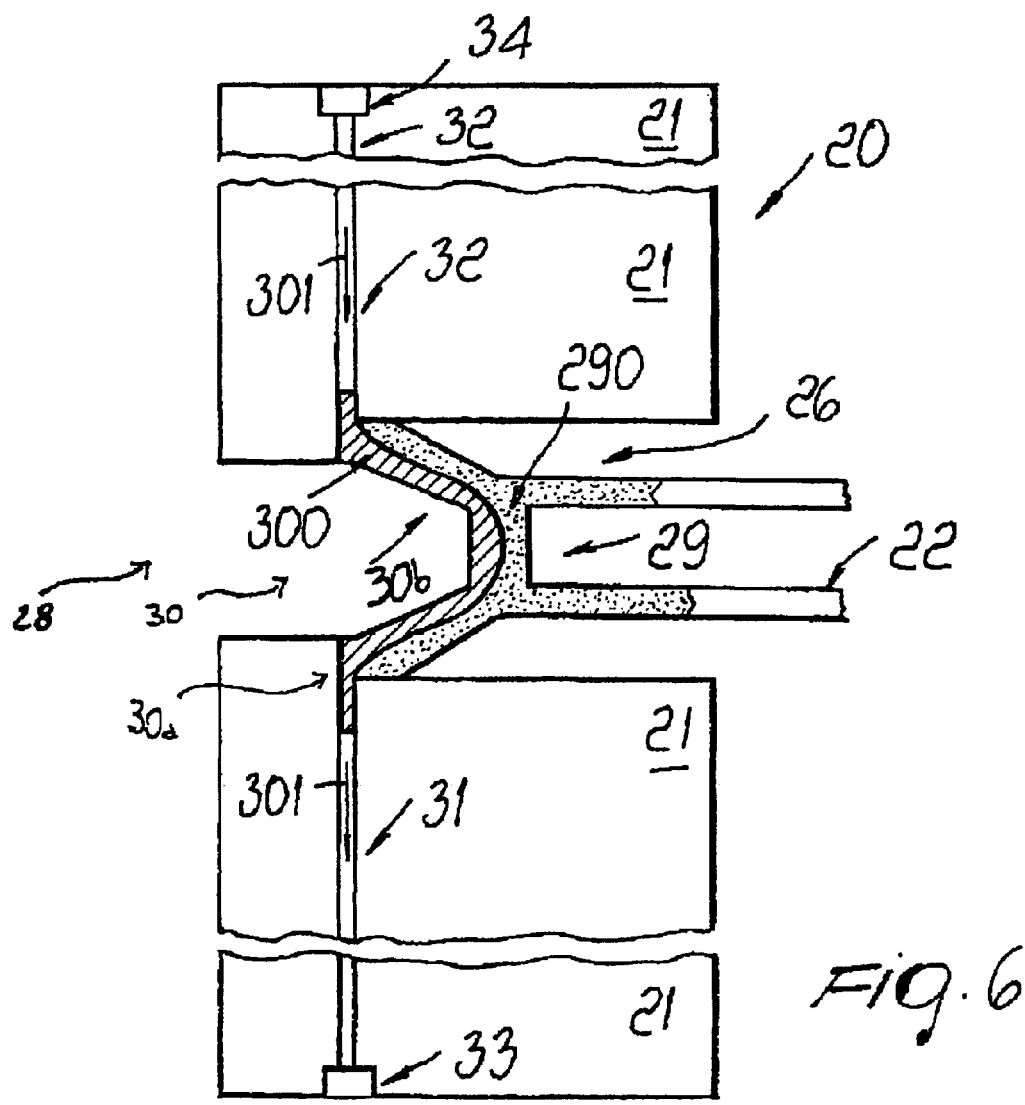
Figure 10:
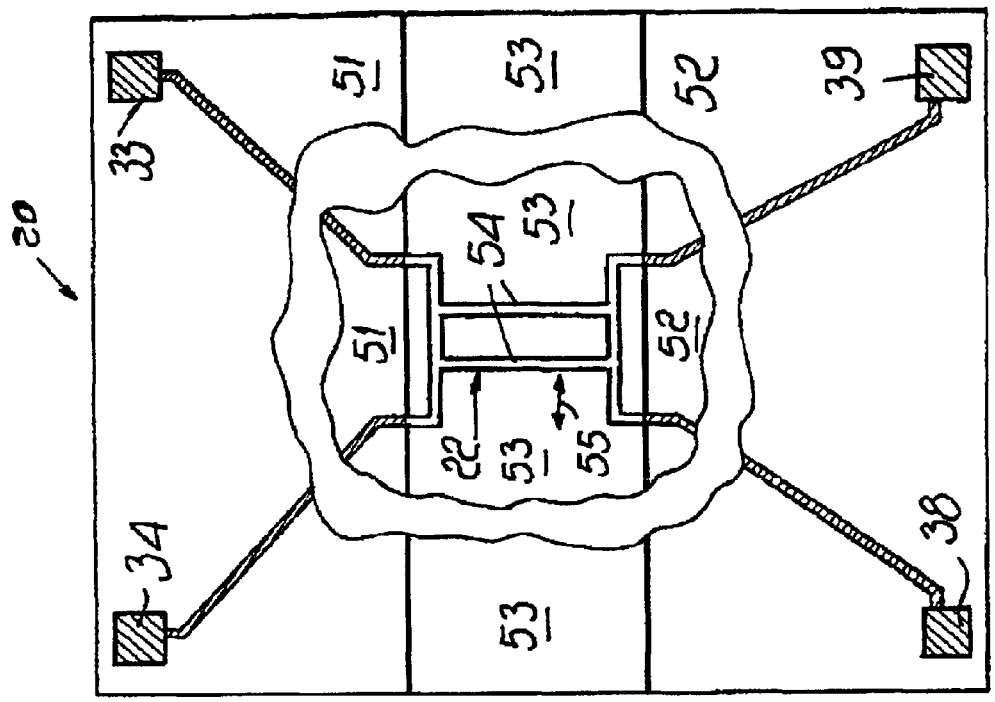
Figure 9:
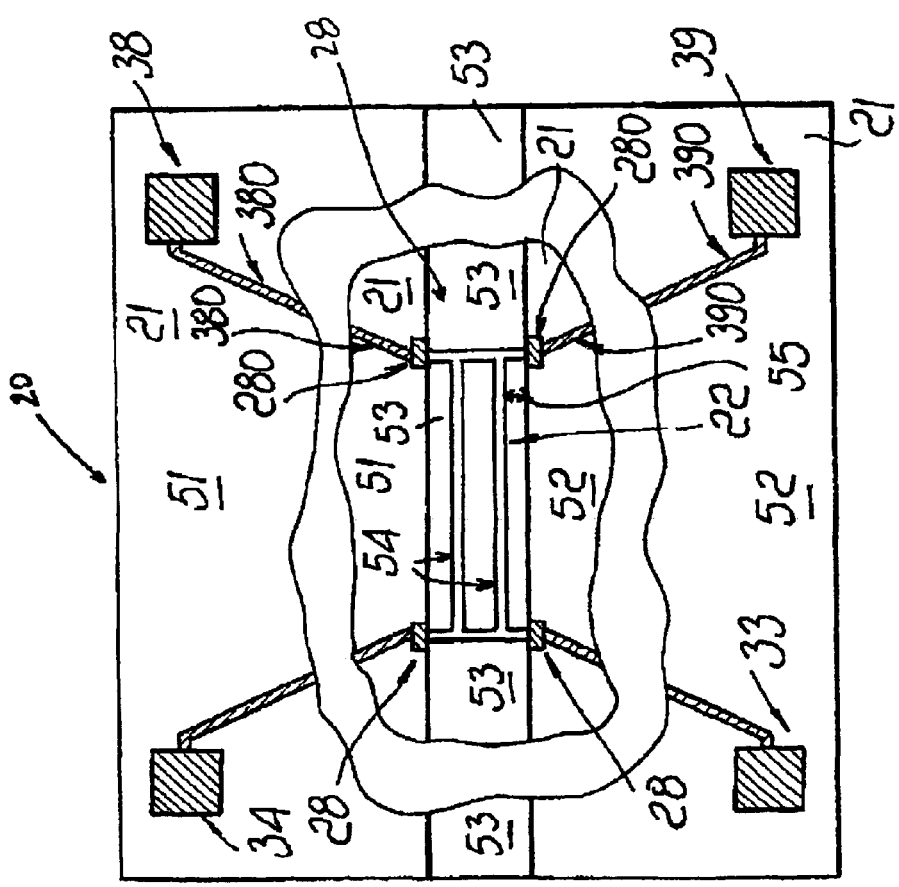

Further characteristics and advantages of the pressure sensing device, according to the present invention, will be described in greater detail hereinafter with particular reference to the accompanying drawings, wherein:

FIG. 1 is a schematic view of a known pressure sensing device;

FIG. 2 is a schematic view of an electronic circuit for sensing the resonance frequency in a known pressure sensing device; and FIG. 3 is a schematic view of another electronic circuit for sensing the resonance frequency in a known pressure sensing device; and FIG. 4 is a schematic view of a known type of resonant element; and FIG. 5 is a schematic view of a pressure sensing device, according to the present invention; and FIG. 6 is a partial view of a first embodiment of the pressure sensing device, according to the present invention; and FIG. 7 is a partial view of a second embodiment of a portion of the pressure sensing device, according to the present invention; and FIG. 8 is a schematic view of an electronic sensing circuit, which can be used in the pressure sensing device, according to the present invention; and FIG. 9 is a view of another preferred embodiment of the pressure sensing device, according to the present invention; and FIG. 10 is a view of another preferred embodiment of the pressure sensing device, according to the present invention.

With reference to the above figures, the pressure sensing device (FIG. 5), according to the present invention, is generally designated by the reference numeral 20. The pressure sensing device 20 comprises a measurement diaphragm 21, which is made, at least partially, of semiconductor material. The diaphragm 21 preferably can comprise one or more layers of silicon with positive-type doping (commonly known as P-type doping) with relatively low doping atom concentrations (approximately $10^{15}$ $cm^{-3}$). The measurement diaphragm 21 is provided with a first surface 23 and a second surface 24, which are exposed respectively to a first pressure P1 and to a second pressure P2. The measurement diaphragm 21 is subjected to a deformation, indicated by a double arrow 25, as a consequence of the application of the pressures P1 and P2.

Furthermore, the pressure sensing device 20 comprises a resonant element 22, which is made, at least partially, of semiconductor material (for example silicon). Preferably, the resonant element 22 can be made of positively or negatively doped silicon and can be obtained directly from one of the silicon layers of the measurement diaphragm 21, adopting proper "silicon micromachining" techniques.

The resonant element 22 can be preferably provided with a first end portion 26 and with a second end portion 27. The end portions 26 and 27 are able to mechanically couple the resonant element 22 to the measurement diaphragm 21. In this manner, the oscillation frequency of the resonant element 22 can vary, according to the deformation 25 undergone by the measurement diaphragm 21. Obviously, this means that the oscillation frequency of the resonant element 22 can vary, ultimately, according to the resulting value of the pressure P=(P1−P2) applied to the diaphragm.

The pressure sensing device 20 comprises also first circuit means (not shown in FIG. 5) for generating a sensing signal, which is indicative of the oscillation frequency of the resonant element 22. Accordingly to what described above, the sensing signal (hereinafter referred as $V_R$) is an alternate signal, whose frequency depends on the resulting value of the pressure P=(P1−P2) applied to the diaphragm.

A portion of the measurement diaphragm 21 and one of the end portions (the end portion 26, for example) of the resonant element 22 are illustrated with reference to FIG. 6. Also, FIG. 6 partially illustrates the first circuit means 28, for generating the mentioned sensing signal $V_R$.

In the pressure sensing device 20, according to the present invention, the resonant element 22 comprises, at least partially, second circuit means 29 for increasing the intensity of the sensing signal $V_R$. The second circuit means 29 are, at least partially, integrated with the structure of the resonant element 22. In practice, the second circuit means 29 can also constitute, at least partially, an integral part of the structure (intended as the physical structure) of the resonant element 22. In particular, according to a preferred embodiment of the present invention, the second circuit means 29 can be integrated with the structure of the first end portion 26 and/or with the structure of the second end portion 27 of the resonant element 22.

The second circuit means 29 preferably comprise a first region made of semiconductor material (the stippled area 290). The first region 290 includes one or more layers made of piezoresistive semiconductor material.

The layers of piezoresistive semiconductor material of the first region 290 are advantageously located where the first end portion 26 and/or of the second end portion 27 are subjected to the highest flexural/compression stress during the oscillation of the resonant element 22. The arrangement of the first region 290 can therefore be easily designed "ad hoc", depending on the geometry of the end portions 26 and 27, which may be any according to the needs. In practice, given the geometry of the end portions 26 and 27, it is possible to evaluate (e.g. by virtue of simulation programs) which regions of the end portions 26 and 27 are subjected to the highest compression/flexural stress. Then, during the manufacture of the pressure sensing device 20, using appropriate silicon micromachining techniques, it is possible to integrate these layers of piezoresistive semiconductor material. In this manner, the first region 290 is arranged, so as to include, at least partially, the regions of the end portions 26 and 27, which are subjected to the highest compression/flexural stresses. This allows the second circuit means 29 to improve the amplification of the sensing signal $V_R$.

Preferably, the first region 290 can comprise one or more layers of monocrystalline silicon, whose doping concentrations can be substantially different from the doping concentrations used for the remaining portion of the structure of the resonant element 22. For example, according to a preferred embodiment, the region 290 can have high N-type doping concentrations (for example higher than $10^{18}$ cm$^{-3}$), while the resonant element 22 can have low P-type doping concentrations (for example lower than $10^{13}$ cm$^{-3}$). Obviously, other types of doping concentrations may be used, according to the needs. Alternatively, the first region 290 can comprise one or more layers of polycrystalline silicon, which might be opportunely doped, according to what described above.

Preferably, the first circuit means 28 can comprise a first terminal 34 and a second terminal 33, which can be preferably integrated, at least partially, with the structure of the diaphragm 21. In this case, the terminals 33 and 34 can be electrically connected, respectively by virtue of a first conducting path 32 and a second conducting path 31, to a second region 300 (the shaded area in FIG. 6), electrically connected to the second circuit means 29. The second region 300 operates as a first sensor element 30, suitable to generate the sensing signal $V_R$, indicative of the oscillation frequency of the resonant element 22. The conducting paths 31 and 32 also are preferably at least partially integrated with the structure of the diaphragm 21 and can be provided by silicon layers with high-concentration N-type doping or by means of metallic layers deposited onto the diaphragm 21. The second region 300 can be integrated, at least partially, with the structure of the first end portion 26 of the resonant element 22 (see the reference numeral 30b of FIG. 6). The second region 300 can also be integrated, at least partially with the structure of a portion of the measurement diaphragm 21, which is located proximate to the first end portion 26 (see the reference numeral 30a of FIG. 6). The second region 300 can be advantageously made of piezoresistive semiconductor material (for example silicon with P-type doping). In practice it is possible to use the same type of semiconductor material used to provide the resonant element and/or the diaphragm.

Preferably, in accordance with an embodiment of the pressure sensing device 20, according to the present invention (see FIG. 9), the first circuit means 28 can also comprise a third terminal 38 and a fourth terminal 39. Terminals 38 and 39 can be preferably integrated, at least partially, with the structure of the diaphragm 21) and can be electrically connected, respectively by means of a third conducting path 380 and by means of a fourth conducting path 390, to a third region (not shown), electrically connected to the first means 29. Again, paths 380 and 390 can be preferably integrated, at least partially, with the structure of the diaphragm 21. The third region operates as a second sensor element 280, suitable for the generation of the sensing signal $V_R$. The third region can be at least partially integrated with the structure of the second end portion 27 and/or with the structure of a portion of the measurement diaphragm 21, located proximate to the second end portion 27.

The advantages of the described embodiments related to the pressure sensing device 20 according to the invention are considerable.

If S is the flexural/compression stress, to which the resonant element 22 is subjected, one in fact can obtain:

$$S = St + Sb \approx St \qquad (1)$$

where St is the compression/flexural stress affecting the end portions 26 and 27 of the resonant element 22 and Sb is the compression/flexural stress, affecting the part of the resonant element that does not comprise the end portions 26 and 27.

If $A_{VR}$ is the amplitude of the signal $V_R$, one can write:

$$A_{VR} = T^*(St + Sb), \qquad (2)$$

where T is the overall transduction coefficient of the sensing system.

Finally, since St>>Sb, one can write $$A_{VR} = T^*(St + Sb) \approx T^*St = (T1 + T2)^*St \qquad (2)$$

where T1, T2 are two constants which are proportional to the transduction coefficients of the first circuit means 28 and of the second circuit means 29.

From relation (3), one can see that the effect of the second circuit means 29 is to increase the overall transduction coefficient of the sensing system and ultimately, for an equal compression/flexural stress affecting the end portions 26 and 27, the amplitude of the sensing signal $V_R$.

The arrangement and type of doping of the first region 290 allow to further increase the value of the constant T2.

The use of different types of doping for the first region 290, the second region 300 and the remaining portions of the resonant element 22 allows limiting the onset of dissipative phenomena (for example parasitic currents). The flow of bias current through the resonant element 22 (the bias current preferably follows the path indicated by the arrows 301) can also be reduced to negligible values.

In FIG. 6, the regions 290 and 300 are shown to be complementary in covering the surface of the end portion 26. According to the needs, both regions can cover the entire surface of the end portion 26 and can be arranged on overlapping planes. This might be advantageous if one finds that the entire end portion 26 is subjected to a relatively high compression/flexural stress.

As mentioned above, together with the type of doping and with the arrangement of the first region 290, the geometry of the end portion 26 and/or 27 can be designed "ad hoc". This allows not only optimizing the mechanical performance of the resonant element 22 but also to allow the means 29 to further increase the value of the constant T2 and, consequently, the intensity of is the sensing signal $V_R$.

For example, with reference to FIG. 7, at least one of the two end portions 26 and/or 27 can have a substantially H-shaped geometry. In this case, the first region 290 can be located on the resonant element 22, while the second region 300 can be located on the diaphragm 21. Advantageously, the first region 290 can comprise a layer of silicon with low P-type doping, while the remaining structure of the resonant element 22 comprises layers of silicon with high N-type doping and is biased at ground voltage. By virtue of this geometry, one can obtain a particularly high concentration of mechanical stresses at the first region 290, with a consequent increase in the constant T2.

With reference to FIG. 8, the pressure sensing device 20, according to the invention, can comprise an electronic bridge circuit 40 (whose structure is substantially similar to the structure of FIG. 2). The bridge circuit 40 can be electrically connected to the first electronic means 28, respectively by means of the first terminal 33 and the second terminal 34 or by means of the third terminal 38 and the fourth terminal 39. The operation of the bridge circuit is ensured by the fact that, following the application of a bias voltage to one pair of terminals, the current trends to pass through the resistive circuit 41. In practice, the bias current path is indicated by arrow 301 of FIGS. 6 and 7. As it is possible to notice, the bias current path 301 is located at the first end portion 26 and substantially comprises the first circuit means 28 and the second circuit means 29.

As mentioned, the bias current does not pass substantially through the remaining body of the resonant element 22, whose equivalent resistance (R5) is relatively much higher than the circuit 41. The bridge circuit 40 can be electrically connected to the first electronic means 28 by means of the third terminal 38 and the fourth terminal 39. In this case, the bias current can pass also through a resistive circuit 42, which is located at the second end portion 27 and substantially comprises the first circuit means 28 and the second circuit means 29.

In a preferred embodiment of the pressure sensing device, according to the present invention, shown in FIG. 9, the measurement diaphragm 21 comprises a first portion 51 and a second portion 52, made of semiconductor material, which are mutually separated, so as to form a gap 53 in between. The portions 51 and 52 are preferably electrically insulated from each other. The resonant element 22 is arranged, so that it can be accommodated in the gap 53 and preferably comprises one or more oscillating arms 54, arranged between the first end portion 26 and the second end portion 27. According to the embodiment of FIG. 9, the oscillating arms 54 of the resonant element 22 are arranged, so that they are substantially parallel to the walls of the gap 53. In this case, the terminals 34 and 38 of FIG. 8 are comprised within the portion 51 of the measurement diaphragm 21, while the terminals 33 and 39 of FIG. 8 are comprised within the portion 52 of the measurement diaphragm 21.

Alternatively, as shown in FIG. 10, the oscillating arms 54 of the resonant element 22 are arranged, so that they are substantially perpendicular to the walls of the gap 53. In this case, the terminals 33 and 34 of FIG. 8 are comprised within the portion 51 of the measurement diaphragm 21, while the terminals 38 and 39 of FIG. 8 are comprised within the portion 52 of the measurement diaphragm 21.

Preferably, the resonant element 22 comprises two arms 54 which oscillate in a direction of motion, which is substantially parallel (arrow 55) to the surface of the measurement diaphragm 21.

The portions 51 and 52 that are electrically insulated, as well as the gap 53, can be obtained by applying silicon micromachining techniques to the measurement diaphragm 21.

Advantageously, the pressure sensing device 20 can comprise excitation means (not shown), aimed at sustaining the oscillation of the resonant element 22. These excitation means may be preferably integrated, at least partially, on the diaphragm 21.

In practice it has been found that the pressure sensing device, according to the present invention, fully achieves the intended aim and objects, since in particular it has been found that it is possible to obtain amplitudes of the sensing signal $V_R$, which are remarkably higher than in known pressure sensing devices. In particular, amplitude values higher by almost one order of magnitude (a few mVs) can be easily obtained. This allows avoiding the use of auxiliary electronic circuits for the preliminary processing of the sensing signal.

The pressure sensing device, according to the present invention, has furthermore proven to be easy to manufacture with known silicon micromachining techniques, thus allowing reducing significantly the manufacturing and installation costs of the pressure transmitter, in which the pressure sensing device can be commonly used. The pressure sensing device, according to the present invention, is particularly suitable for pressure measurements of the differential type. Also measurements of the absolute type and the gauge type can be easily obtained. In the first case, P1 or P2 has negligible values, closed to vacuum pressure values. In the second case, P1 or P2 has values closed to atmospheric pressure values.

What is claimed is:

1. A pressure sensing device, for measuring the pressure of a fluid, comprising:

a measurement diaphragm, which is at least partially made of semiconductor material and is provided with a first surface and a second surface that are exposed respectively to a first pressure and to a second pressure, said measurement diaphragm being subjected to a deformation, following the application of said first pressure and said second pressure; and a resonant element, at least partially made of semiconductor material, which is provided with a first end portion and with a second end portion for mechanically coupling said resonant element to said measurement diaphragm, the oscillation frequency of said resonant element varying as a function of the deformation, to which said measurement diaphragm is subjected; and first circuit means for generating a sensing signal, which is indicative of the oscillation frequency of said resonant element;

characterized in that said resonant element comprises second circuit means for increasing the intensity of said sensing signal, said second circuit means being at least partially integrated with the structure of said resonant element.

2. The pressure sensing device, according to claim 1, characterized in that said second circuit means are integrated with the structure of the first end portion and/or the second end portion of said resonant element.

3. The pressure sensing device, according to claim 1, wherein said second circuit means comprise a first region of semiconductor material, which comprises one or more layers of piezoresistive semiconductor material.

4. The pressure sensing device, according to claim 1, wherein said first region is arranged, so as to comprise, at least partially, the regions of the first end portion and/or the second end portion of said resonant element, which are subjected to the highest flexural/compression stress during the oscillation of said resonant element.

5. The pressure sensing device, according to claim 1, wherein said first circuit means comprise a first terminal and a second terminal, which are electrically connected.

6. The pressure sensing device, according to claim 5, characterized in that said second region operates as a first sensor element, suitable to generate said sensing signal.

7. The pressure sensing device, according to claim 1, wherein said second region is, at least partially integrated with the structure of the first end portion of said resonant element and/or with the structure of a portion of said measurement diaphragm, located proximate to the first end portion of said resonant element.

8. A pressure sensing device, according to claim 1, wherein said first circuit means comprise a third terminal and a fourth terminal which are electrically connected, respectively by means of a third conducting path and a fourth conducting path, to a third region, made of piezoresistive semiconductor material.

9. The pressure sensing device, according to claim 8, characterized in that said third region operates as a second sensor element, suitable to generate said sensing signal.

10. The pressure sensing device, according to claim 1, wherein third second region is, at least partially, integrated with the structure of the second end portion of said resonant element and/or with the structure of a portion of said measurement diaphragm, located proximate to the second end portion of said resonant element.

11. The pressure sensing device, according to claim 1, wherein said first terminal and/or said second terminal and/or said third terminal and/or said fourth terminal are at least partially integrated in the structure of said measurement diaphragm.

12. The pressure sensing device, according to claim 1, wherein said first conducting path and/or said second conducting path and/or said third conducting path and/or said fourth conducting path are at least partially integrated in the structure of said measurement diaphragm.

13. The pressure sensing device, according to claim 1, wherein said resonant element comprises a pair of arms, which oscillate in a direction of motion which is substantially parallel to the surface of said measurement diaphragm.

14. An absolute pressure measuring apparatus, such as an absolute pressure transmitter or the like, wherein it comprises a pressure sensing device, according to claim 1.

15. A gauge pressure measuring apparatus, such as a gauge pressure transmitter or the like, wherein it comprises a pressure sensing device, according to claim 1.

16. A differential pressure measuring apparatus, such as a differential pressure transmitter or the like, wherein it comprises a pressure sensing device, according to claim 1.

17. The pressure sensing device, according to claim 2, wherein said second circuit means comprise a first region of semiconductor material, which comprises one or more layers of piezoresistive semiconductor material.

18. The pressure sensing device, according to claim 2, wherein said first region as arranged, so as to comprise, at least partially, the regions of the first end portion and/or the second end portion of said resonant element, which are subjected to the highest flexural/compression stress during the oscillation of said resonant element.

19. The pressure sensing device, according to claim 3, wherein said first region is arranged, so as to comprise, at least partially, the regions of the first end portion and/or the second end portion of said resonant element, which are subjected to the highest flexural/compression stress during the oscillation of said resonant element.

20. The pressure sensing device, according to claim 2, wherein said first circuit means comprise a first terminal and a second terminal, which are electrically connected, respectively by means or a first conducting path and a second conducting path, to a second region, made of piezoresistive semiconductor material.

* * * * *